United States Patent Office 2,758,148
Patented Aug. 7, 1956

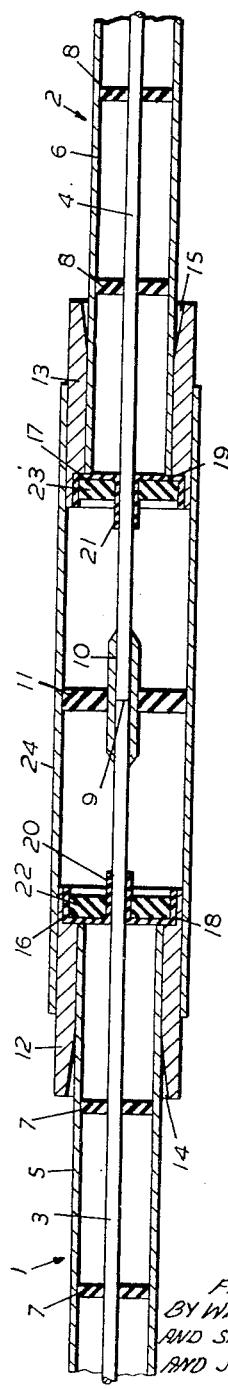

2,758,148

COAXIAL CABLE JOINTS

Frank Douglas Barnes, deceased, late of London, England, by William James Cook Taylor, executor, Eltham, London, England, and Sidney Frederick Plant and John Richard Eyre, London, England, assignors to International Standard Electric Corporation, New York, N. Y., a corporation of Delaware Application March 7, 1951, Serial No. 214,264

Claims priority, application Great Britain March 8, 1950

3 Claims. (Cl. 174—22)

This invention relates to joints for coaxial conductor electric cables having air spaced insulation and has particularly reference to water-tight barrier joints for the cores of such cables.

The construction of coaxial cores is such that they only present a limited resistance to the flow of water along their length. If therefore the outer sheath of a cable containing one or more coaxial cores is damaged so that water can enter, several lengths of cable may quickly become damaged if the water is allowed to flow unimpeded from one cable length to another.

Several forms of barrier joint have been devised but have generally suffered from the disadvantage that rather large barrier plugs had to be fitted in the space between the inner and outer conductors which resulted in the occurrence of impedance irregularities, particularly at high frequencies.

The object of the present invention is to provide a reliable water tight barrier joint which is easy to construct and which results in the minimum of impedance irregularity.

According to the invention there is provided in a barrier joint for an air-spaced coaxial conductor electric communication cable a pair of hydraulic type cup-shaped resilient insulating washers between the inner and outer conductors said washers having their flanges directed in opposite directions whereby any leakage of water into the cable is effectively blocked at the joint by the expansion of at least one of said washers.

The term hydraulic type cup-shaped washer refers to the type found for example in reciprocating water pumps.

Preferably the respective washers are slightly strained over discs of hard insulating material serving to space the inner conductors from the tubular collars.

There are thus provided at a joint two barriers one on each side of the joint so that if water should pass from one cable length past the first barrier into the joint, it would be prevented from passing further from the joint into the next core length by a second barrier of such construction as to seal itself under the water pressure.

The invention will now be described with reference to one embodiment shown in the accompanying drawing.

In the drawing there is shown the ends of two coaxial core lengths 1, 2 comprising inner conductors 3, 4 supported coaxially within outer conductors 5, 6 by insulating discs 7, 8. The two inner conductors 3, 4 abut at 9 and are joined together by a tubular metallic ferrule 10 which is soldered to the two inner conductors in the usual manner.

On the ferrule 10 there is mounted an insulating and centralising disc 11. The outer conductors 5, 6 are cut back a short distance at each core end and tubular collars 12, 13 are mounted on each of the outer conductor ends as shown and are firmly secured by soldering or sweating. The collars 12, 13 are provided with slight internal chamfers 14, 15 to facilitate their being slipped over the outer conductor ends. At the ends of the collars nearest to the centre of the joint they are internally recessed as shown at 16, 17. Into these recesses specially moulded cup shaped soft rubber washers 18, 19 are fitted. These washers have protruding tubular portions 20, 21 which fit closely over the inner conductors 3, 4. After the soft rubber washers 18 and 19 have been put in place, apertured discs 22, 23 of a hard insulating material such as hard rubber are pressed into the soft rubber washers 18, 19. The joint is finally completed by means of an outer metallic sleeve 24 which overlaps the tubular collars 12, 13 and is soldered thereto.

After the soft rubber washers 18 and 19 and the discs 22 and 23 have been put in place, it is preferable to inwardly crimp or compress the edges of the collars 12 and 13 slightly to hold the washers and discs in position and increase the effectiveness of the water seal.

It can now be seen that if water were to obtain access to say the coaxial core 1, shown on the left of the drawing, it would, if under any pressure, pass into the center of the joint past rubber washer 18 but the pressure built up against disc 23 would press rubber washer 19 firmly against the shoulder in the collar 13 and prevent water passing into the right hand core 2.

In the drawing the thickness of the components of the actual barriers has been somewhat exaggerated in the interests of clarity and in practice the thickness of the barriers is about the same as that of the discs 7 and 8 and the centralizing disc 11 so that if the barriers are arranged at the correct positions along the conductors there will be no appreciable impedance irregularity.

Although the description of the embodiment given above referes to a coaxial core with disc insulation, for which the invention is particularly suitable, the form of water barrier described might nevertheless be applied to coaxial cores having other forms of insulation as, for example, open helices of insulating material, or a succession of hollow cylinders with regularly spaced diametrical disc or to cores in which the insulating means consists of longitudinally arranged interlocking strips.

While the principles of the invention has been described above in connection with specific embodiments and particular modifications thereof, it is to be clearly understood that this description is made only by way of example and not as a limitation on the scope of the invention.

What we claim is:

1. A water tight barrier joint for a coaxial conductor having outer and inner conductors comprising two tubular metallic collars provided with annular recesses and mounted on the respective ends of the outer conductors to be joined, two washers of a resilient material each consisting of a disc shaped portion carrying a peripheral flange at right angles to the disc and also carrying a tubular portion projecting centrally from the disc in the same sense as the peripheral flange, the dimensions of the several parts of the washers being such that said disc portions and flanges engage said recesses in the metallic collars and that said tubular portions embrace the inner conductors, the two resilient washers being so positioned that similar surfaces face one another, apertured discs of a hard insulating material being pressed into the annular spaces bounded by said flanges and said tubular portions.

2. A water tight barrier joint as claimed in claim 1 in which the relative dimensions of the resilient washers and the discs of hard insulating mtaerial are such that the peripheral flanges of the resilient washers are stretched over the hard discs whereby said discs are firmly retained in position in the annular recess.

3. A water tight barrier joint as claimed in claim 1 in which the edges of the tubular metallic collars are crimped to ensure that the resilient washers and the discs of hard insulating material are firmly retained within the recess.

References Cited in the file of this patent

UNITED STATES PATENTS

| | | |
|---|---|---|
| 1,582,012 | Hugo | Apr. 20, 1926 |
| 2,036,002 | Walter | Mar. 31, 1936 |
| 2,120,889 | Emanueli | June 14, 1938 |
| 2,156,772 | Seeley | May 2, 1939 |

FOREIGN PATENTS

| | | |
|---|---|---|
| 524,388 | Great Britain | Aug. 6, 1940 |